United States Patent
Nishizawa et al.

(10) Patent No.: US 10,636,316 B2
(45) Date of Patent: *Apr. 28, 2020

(54) EDUCATION SUPPORT SYSTEM AND TERMINAL DEVICE

(71) Applicant: SHINANO KENSHI KABUSHIKI KAISHA, Nagano (JP)

(72) Inventors: Tatsuo Nishizawa, Nagano (JP); Yusuke Tashiro, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 173 days.

This patent is subject to a terminal disclaimer.

(21) Appl. No.: 15/557,735

(22) PCT Filed: Apr. 7, 2016

(86) PCT No.: PCT/JP2016/061339
§ 371 (c)(1),
(2) Date: Sep. 12, 2017

(87) PCT Pub. No.: WO2016/175005
PCT Pub. Date: Nov. 3, 2016

(65) Prior Publication Data
US 2018/0068575 A1 Mar. 8, 2018

(30) Foreign Application Priority Data
Apr. 30, 2015 (JP) .................. 2015-093669

(51) Int. Cl.
*G09B 5/08* (2006.01)
*G06Q 50/20* (2012.01)
(Continued)

(52) U.S. Cl.
CPC .............. *G09B 5/08* (2013.01); *G06F 3/013* (2013.01); *G06F 3/0488* (2013.01); *G06F 3/16* (2013.01);
(Continued)

(58) Field of Classification Search
CPC ... G09B 5/08; G09B 5/14; G09B 5/06; G06Q 50/20; G06F 3/16; G06F 3/0488; G06F 3/013
See application file for complete search history.

(56) References Cited

U.S. PATENT DOCUMENTS

2005/0191604 A1    9/2005  Allen
2010/0070263 A1*   3/2010  Goto .................... G06F 16/685
                                                                704/8
(Continued)

FOREIGN PATENT DOCUMENTS

| JP | 2000057752 | 2/2000 |
| JP | 2004061788 | 2/2004 |
| JP | 2014089443 | 5/2014 |

OTHER PUBLICATIONS

International Search Report for PCT/JP2016/061339, dated Jul. 5, 2016.
(Continued)

*Primary Examiner* — Reginald A Renwick
*Assistant Examiner* — Shauna-Kay Hall
(74) *Attorney, Agent, or Firm* — Stephen J. Weyer; Stites & Harbison, PLLC (57) ABSTRACT

An education support system provides information that helps educators and students to achieve effective and efficient learning. The system includes a plurality of terminal devices and a server. The terminal devices include a terminal display unit, voice output unit, reproduction log data memory unit, and transmission unit. The server includes a
(Continued)

digital content memory unit that stores digital content received from the terminal devices, a receiver unit that receives the reproduction log data transmitted from the respective terminal devices, a data conversion unit, a server display unit; and a display control unit that arranges strings of phrases in the reproduction log data in a vertical direction, displays times spent on reproduction of the strings of the phrases to be displayed with the lateral length of the squares on a right side of the respective strings, and displays number of times of reproduction by phrase on the same screen.

11 Claims, 11 Drawing Sheets

(51) Int. Cl.
| | | |
|---|---|---|
| *G09B 5/06* | (2006.01) | |
| *G09B 7/02* | (2006.01) | |
| *G11B 27/10* | (2006.01) | |
| *G06Q 10/10* | (2012.01) | |
| *G06F 3/16* | (2006.01) | |
| *G06F 3/01* | (2006.01) | |
| *G06F 3/0488* | (2013.01) | |
| *G09B 5/14* | (2006.01) | |
| *G10L 13/00* | (2006.01) | |

(52) U.S. Cl.
CPC .............. *G06Q 10/10* (2013.01); *G06Q 50/20* (2013.01); *G09B 5/06* (2013.01); *G09B 5/14* (2013.01); *G09B 7/02* (2013.01); *G11B 27/10* (2013.01); *G10L 13/00* (2013.01)

(56) References Cited

U.S. PATENT DOCUMENTS

2011/0262887 A1* 10/2011 Cleveland ................ G09B 5/00
434/247
2014/0013216 A1* 1/2014 Sakuta .................. G06F 3/0483
715/252

OTHER PUBLICATIONS

Junko Amano, "A Learning Support System for Children with Difficulties in Reading and Writing", IEICE Technical Report, vol. 104, No. 314, pp. 7 to 12.

* cited by examiner

"SO,SO, NAH, KASUKE", SAID HYOJU.

"AAN?"

"OREA, KONOGORO, TOTEMOHUSHIGINAKOTOGAARUNDA"

"NANIGA?"

"OKKAAGASHINDEKARAWA, DAREDAKASHIRANGA, ORENIKURIYAMATSUTAKENANKAWO, MAINICHIMAINICHIKURERUNDAYO"

"HUUN, DAREGA?"

"SOREGAWAKARANNODAYO. ORENOSHIRANUCHINI, OITEIKUNDA"

GON FOLLOWED THESE TWO.

*REPR = REPRODUCTION

| TIMES AND DATES | OPERATION | STATE | TITLE | REPR FILE | PHRASE ID | TEXT OF CORRESPONDING PHRASE |
|---|---|---|---|---|---|---|
| 2015/2/4/ 10:7:15.842 | START | | gonM | | | |
| 2015/2/4/ 10:7:18.975 | TOP TITLE | | gonM | 00.html | | |
| 2015/2/4/ 10:7:20.976 | REPR BUTTON | | gonM | 00.html | | |
| 2015/2/4/ 10:7:21.899 | STOP BUTTON | | gonM | 00.html | | |
| 2015/2/4/ 10:7:23.926 | SET | REPR SPEED | gonM | 00.html | | |
| 2015/2/4/ 10:7:29.116 | REPR BUTTON | | gonM | 00.html | xnjpu_0001 | GONGITSUNE |
| 2015/2/4/ 10:7:31.489 | | REPR | gonM | 00.html | xnjpu_0001 | GONGITSUNE |
| 2015/2/4/ 10:7:33.189 | | REPR | gonM | 00.html | xnjpu_0001 | GONGITSUNE |
| 2015/2/4/ 10:7:33.619 | | REPR | gonM | 01.html | xnjpu_0001 | GONGITSUNE −1 |
| 2015/2/4/ 10:7:35.618 | | REPR | gonM | 01.html | xnjpu_0001 | NIIMINANKICHI |
| 2015/2/4/ 10:7:44.443 | | REPR | gonM | 01.html | xnjpu_0003 | KOREWA, WATASHIGACHIISAITOKINI |
| 2015/2/4/ 10:7:48.597 | STOP BUTTON | | gonM | 01.html | xnjpu_0004 | MUKASHIWA, WATASHITACHINOMURANOCHIKAKUNO |
| 2015/2/4/ 10:7:51.284 | SET | REPR SPEED | gonM | 01.html | xnjpu_0002 | MUKASHIWA, WATASHITACHINOMURANOCHIKAKUNO |
| 2015/2/4/ 10:7:53.095 | REPR BUTTON | | gonM | 01.html | xnjpu_0003 | −2 |
| 2015/2/4/ 10:7:58.290 | TOP TITLE | | gonM | 00.html | xnjpu_0001 | GONGITSUNE |
| 2015/2/4/ 10:8:1.593 | | REPR | gonM | 00.html | xnjpu_0001 | NIIMINANKICHI |
| 2015/2/4/ 10:8:3.790 | | REPR | gonM | 00.html | xnjpu_0003 | |
| 2015/2/4/ 10:8:3.918 | | REPR | gonM | 01.html | xnjpu_0004 | KOREWA, WATASHIGACHIISAITOKINI |
| 2015/2/4/ 10:8:5.810 | | REPR | gonM | 01.html | xnjpu_0002 | MUKASHIWA, WATASHITACHINOMURANOCHIKAKUNO |
| 2015/2/4/ 10:8:15.427 | | REPR | gonM | 01.html | xnjpu_0003 | "GONGITSUNE"TOIUKITSUNEGAIMASHITA. |
| 2015/2/4/ 10:8:28.571 | | REPR | gonM | 01.html | xnjpu_0004 | GONWA, HITORIBOCCHINOKOGITSUNEDE |
| 2015/2/4/ 10:8:38.287 | | REPR | gonM | 01.html | xnjpu_0005 | GONWA, HITORIBOCCHINOKOGITSUNEDE |
| 2015/2/4/ 10:8:38.933 | STOP BUTTON | | gonM | 01.html | xnjpu_0005 | −3 |
| 2015/2/4/ 10:8:41.368 | SET | REPR SPEED | gonM | 01.html | xnjpu_0005 | GONWA, HITORIBOCCHINOKOGITSUNEDE |
| 2015/2/4/ 10:8:45.536 | REPR BUTTON | | gonM | 01.html | xnjpu_0006 | SOSHITE, YORUDEMOHIRUDEMO |
| 2015/2/4/ 10:8:57.908 | | REPR | gonM | 01.html | xnjpu_0006 | SOSHITE, YORUDEMOHIRUDEMO |
| 2015/2/4/ 10:8:59.029 | STOP BUTTON | | gonM | 01.html | | |
| 2015/2/4/ 10:9:15.121 | END | | gonM | | | |

"SO,SO, NAH, KASUKE", SAID HYOJU.

"AAN?"

"OREA, KONOGORO, TOTEMOHUSHIGINAKOTOGAARUNDA"

"NANIGA?"

"OKKAAGASHINDEKARAWA, DAREDAKASHIRANGA, ORENIKURIYAMATSUTAKENANKAWO, MAINICHIMAINICHIKURERUNDAYO"

"HUUN, DAREGA?"

"SOREGAWAKARANNODAYO. ORENOSHIRANUCHINI, OITEIKUNDA"

GON FOLLOWED THESE TWO.

EDUCATION SUPPORT SYSTEM AND TERMINAL DEVICE

TECHNICAL FIELD

The present invention relates to an education support system based on a learning digital content and a terminal device of the education support system.

BACKGROUND ART

An apparatus that reproduces electronic books memorized as electronic data in advance as a voice is known in the related art (For example, see PTL1). The apparatus disclosed in PTL1 is an apparatus that reproduces digital content based on DAISY (Digital Accessible Information System) standard, and is an apparatus that is able to read out text information in books by voice so that visually impaired people can enjoy reading.

In reproduction of the digital content as described above, e-learning is now spreading in association with improvement of network environment in these years (For example, see PTL2).

Examples of methods of utilization of the e-learning include distributing the digital content to students via the e-learning, and allowing the individual students to operate the respective terminal to reproduce a learning digital content.

CITATION LIST

Patent Literature

PTL1: JP-A-2000-057752
PTL2: JP-A-2004-61788

SUMMARY OF INVENTION

Technical Problem

In a case where students reproduce a learning digital content to learn, an educator side who educates the students needs to figure out and control progress statuses of learning immediately after terminations of reproduction.

The students themselves as well can figure out their own reading comprehension more easily by confirming the state of reproduction immediately after reproduction.

Solution to Problem

Accordingly, in order to solve the above-described problem, it is an object of the present invention to provide an education support system and a terminal device that are capable of providing information that helps educators and students themselves to achieve effective and efficient learning.

Solution to Problem

An education support system of the present invention includes: one or more terminal devices including; a terminal display unit that displays text data of a digital content including text data and voice data created by reading out the text data, a voice output unit that outputs the voice data of the digital content by voice, a reproduction log data memory unit that memorizes at least ID information on phrases of the digital content reproduced by the terminal display unit and the voice output unit and reproduction start times of the phrases for each of the phrases as reproduction log data, and a transmission unit that transmits the reproduction log data memorized in the reproduction log data memory unit; and a server unit including: a receiver unit that receives the reproduction log data transmitted from each of the terminal devices, a data conversion unit that converts the reproduction log data of each of the terminal devices received by the receiver unit into times spent on reproduction and numbers of times of reproduction by phrase of the digital content, a server display unit that displays the times spent on reproduction and numbers of times of reproduction by phrase of the digital content converted by the data conversion unit, and a display control unit that arranges strings of phrases in the reproduction log data to be displayed by the server display unit in a vertical direction, displays times spent on reproduction of the strings of the phrases with the lateral length of the squares on a right side of the respective strings and displays number of times of reproduction by phrase on the same screen.

In this configuration, the reproduction log data of the digital content reproduced by the terminal devices are displayed by the server device, so that the progress status of learning of the students can easily be figured out.

Each of the terminal devices may include a camera that is directed in the same direction as that of a display surface of the terminal display unit, and visual line detecting means that calculates a visual line direction of an operator by analyzing eye images of the operator of the terminal device taken by the camera and detects a part in a text of the digital content displayed on the terminal display unit to which the calculated visual line is directed, and may be characterized in that a part to which the visual line is directed and which is detected by the visual line detecting means is memorized in the reproduction log data memory unit in association with the reproduction log data, and the display control unit of the server device displays a string to which the visual line is directed in association with the string of the phrase to be displayed on the server display unit.

In this configuration, the position of the visual line of the operator of the terminal device during reproduction of the contents may easily be figured out. Therefore, whether or not the visual line follows correct part may easily be figured out, for example, when examining an answer for a question.

In addition, each of the terminal devices may be characterized in that the terminal display unit is a touch panel, tapped position detecting means is provided, the tapped position detecting means detecting, when the operator taps the terminal display unit during reproduction of the digital content, a part tapped by the operator of the terminal device in the text of the digital content displayed on the terminal display unit, the tapped part detected by the tapped position detecting means is memorized in the reproduction log data memory unit in association with the reproduction log data, and the display control unit of the server device displays the tapped strings in association with the strings of the phrase to be displayed on the server display unit.

In this configuration, the operator of the terminal device can easily figure out the point on the display unit tapped by the operator of the terminal device. Therefore, whether or not a correct part is tapped may easily figured out, for example, when examining an answer for a question.

Each of the terminal devices may be characterized by including a reproduction condition setting unit capable of setting reproduction time setting information including at least a character format, a character color, and voice output conditions by instructions from both the server device and the corresponding terminal device and causes display and voice output of the digital content to be executed on the preset conditions.

In this configuration, the operators of the respective terminal devices may set conditions at the time of reproduction, and the operator of the server device may set conditions at the times of reproduction of the respective terminal devices. Therefore, the operator of the server device is able to set suitable conditions on the basis of the progress statuses of learning.

In addition, each of the terminal devices may be characterized by memorizing the contents of operations that the operators of the respective terminal devices have performed in the reproduction log data memory unit as reproduction log data.

In this configuration, operations performed via the respective terminal devices may also be reliably figured out.

A terminal device of the present invention includes: a display unit that displays text data of a digital content including text data and voice data created by reading out the text data; a voice output unit that outputs the voice data of the digital content by voice, a reproduction log data memory unit that memorizes at least ID information on phrases of the digital content reproduced by the terminal display unit and the voice output unit and reproduction start times of the phrases for each of the phrases as reproduction log data, and a data conversion unit that converts the reproduction log data of the reproduction log data memory unit into times spent on reproduction and numbers of times of reproduction by phrase of the digital content, and a display control unit that arranges strings of phrases in the reproduction log data converted by the data conversion unit in a vertical direction, displays times spent on reproduction of the strings of the phrases to be displayed with the lateral length of the squares on a right side of the respective strings, and displays number of times of reproduction by phrase on the same screen.

In this configuration, since the reproduction log data of the digital content reproduced by the terminal device may be displayed, the progress statuses of learning of the students themselves can easily be figured out.

In addition, each of the terminal devices may include a camera that is directed in the same direction as that of a display surface of the terminal display unit, and visual line detecting means that calculates a visual line direction of an operator by analyzing eye images of the operator taken by the camera and detects a part of a text of the digital content displayed on the display unit to which the calculated visual line is directed, and may be characterized in that a part to which the visual line is directed and which is detected by the visual line detecting means is memorized in the reproduction log data memory unit in association with the reproduction log data, and the display control unit displays a string to which the visual line is directed in association with the string of the phrase to be displayed on the display unit.

In this configuration, the students themselves are capable of figuring out the positions of their visual lines easily. Therefore, whether or not the visual line follows correct part may easily be figured out, for example, when examining an answer for a question.

The part to which the visual line is directed and which is detected by the visual line detecting means may be characterized by being displayed on the display unit in the display of the text data.

In this configuration, the operator is allowed to figure out the position of the visual line on a real-time basis.

The terminal device may be characterized in that the display unit is a touch panel, tapped position detecting means is provided, the tapped position detecting means detecting, when the operator taps the display unit during reproduction of the digital content, the part tapped by the operator in the text of the digital content displayed on the display unit, the tapped part detected by the tapped position detecting means is memorized in the reproduction log data memory unit in association with the reproduction log data, and the display control unit displays tapped strings in association with the strings of the phrase to be displayed on the display unit.

In this configuration, the student can easily figure out the point on the display unit tapped by himself or herself. Therefore, whether or not a correct part is tapped may easily be figured out, for example, when examining an answer for a question.

The terminal device may be characterized in that the content operated by the operator is memorized in the reproduction log data memory unit as the reproduction log data.

In this configuration, operations performed via the respective terminal devices may also be reliably figured out.

Advantageous Effects of Invention

According to the present invention, support of reading comprehension of the student is achieved.

BRIEF DESCRIPTION OF DRAWINGS

FIG. 5 is an explanatory drawing illustrating an example of reproduction log data.

DESCRIPTION OF EMBODIMENTS

Figure 1:
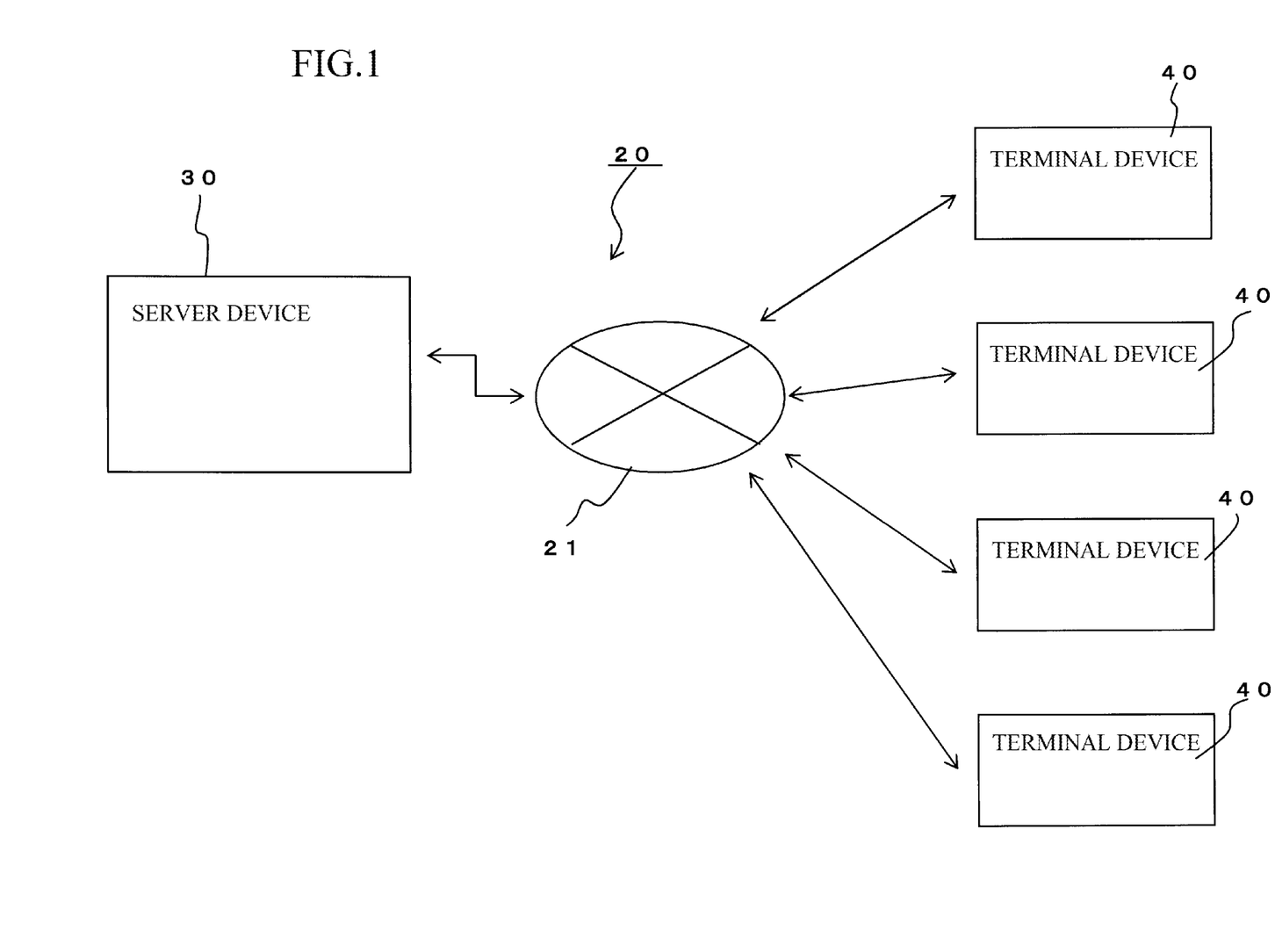
FIG. 1 is an explanatory drawing illustrating a general configuration of an education support system of the present invention.

A general configuration of the education support system according to the present invention is illustrated in FIG. 1.

An education support system 20 includes one or more server devices 30 and one or more terminal devices 40. In FIG. 1, a state in which a plurality of the terminal devices 40 are connected to one server device 30 via a network 21 such as the internet.

The education support system 20 is a system in which individual students have at least one terminal device 40, and the respective students download a learning digital content from the server device 30 to the respective terminal devices 40, and view and listen to the learning digital content. As the learning digital content, electronic books based on DAISY standard are employed. The student operates the terminal device 40 and reproduces the learning digital content, so that text parts of the learning digital content are displayed on the terminal device, and the terminal device operates to read out voice data corresponding to the displayed text parts.

The server device 30 is configured to allow educators or teachers of the students, that is, persons who are in charge of managing the student to operate.

Figure 2:
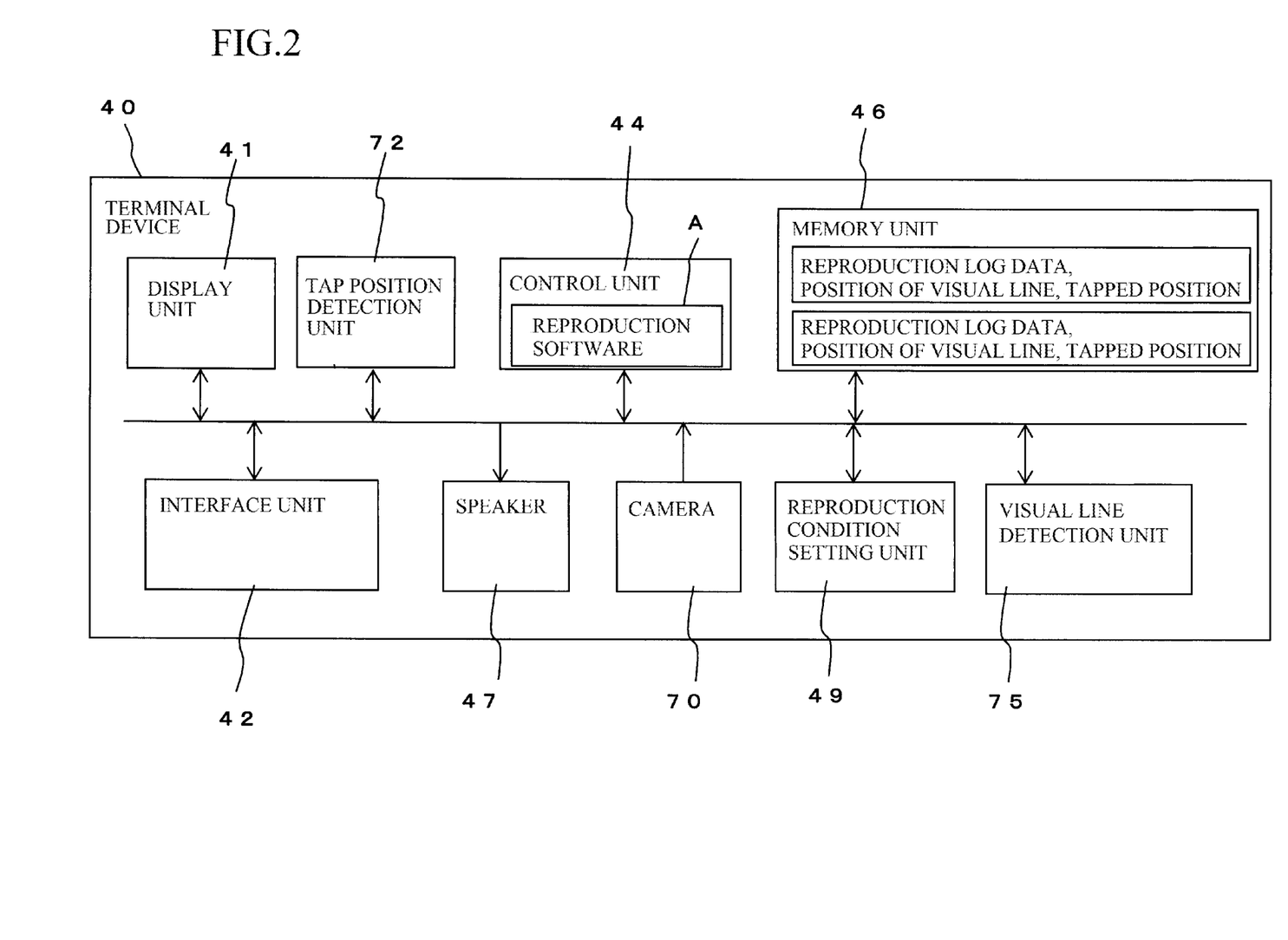
FIG. 2 is a block diagram illustrating an internal configuration of a terminal device.

The terminal device 40 will be described based on FIG. 2 illustrating a configuration of the terminal device 40.

The terminal device 40 may employ a tablet terminal (slate type PC), which is a mobile terminal which can be connected to the internet.

The terminal device 40 includes a display unit 41 that employs a touch panel, an interface unit 42 for connecting to the internet, a control unit 44 including a CPU, a memory, and the like, and a speaker 47 that outputs voice. The above-described display unit 41 corresponds to a terminal display unit in Claims. The above-described speaker 47 corresponds to a voice output unit in Claims.

The terminal device 40 includes reproduction software A that reproduces a digital content memorized in the server device 30. The reproduction software is composed of a program having a function that can reproduce (including streaming reproduction which reproduces while downloading) the digital content downloaded from the server device 30. A reproduction software A is memorized in a memory unit 46 such as a semiconductor memory, and reproduction of the digital content is achieved by the control unit 44 reading out the reproduction software A and executing the same.

The terminal device 40 allows setting of reproduction time setting information including at least a character format, a character color, and voice output conditions. Reproduction of the digital content is performed based on the reproduction time setting information. More specifically, the reproduction time setting information may further include a character font, a font size, and a voice reproduction speed.

Each of the terminal devices 40 includes a reproduction condition setting unit 49 which allows an operator (student) of the terminal device 40 to set the reproduction time setting information and causes display and a voice output of the digital content to be executed on the set condition.

The reproduction condition setting unit 49 is provided so as to be operable not only by the operator (student) of the terminal device 40 but also from the server device 30. In other words, an operator (educator) of the server device 30 is allowed to perform settings at the time of reproduction suitable for the respective students, so that improvement of effect of leaning is achieved.

The digital content in this embodiment is assumed to be electronic books. Examples of representative standards of the electronic books include DAISY standard for digital recorded books.

The electronic book data of the DAYSY standard include smil (Synchronized Multimedia Integration Language) file, an ncc file or an ncx file in which title information is described, an html file or an xml file in which text data which can be displayed on the display unit 41 is described, and a voice data file in which the text data is read out.

The smil file is a sort of markup language, in which the order of display of the respective phrases in the html file or the xml file, and reproduction starting and ending times of the voice data file corresponding to the respective phrases are described.

In the terminal device 40, when the control unit 44 executes the reproduction software A, the text data is displayed on the display unit 41 for each phrase of predetermined digital content. When an operator (student) of the terminal device taps a play button 50 described later, a voice data file of a portion corresponding to the text data displayed on the display unit 41 is synchronized with the text data, and a voice is output from the speaker 47.

Figure 3:
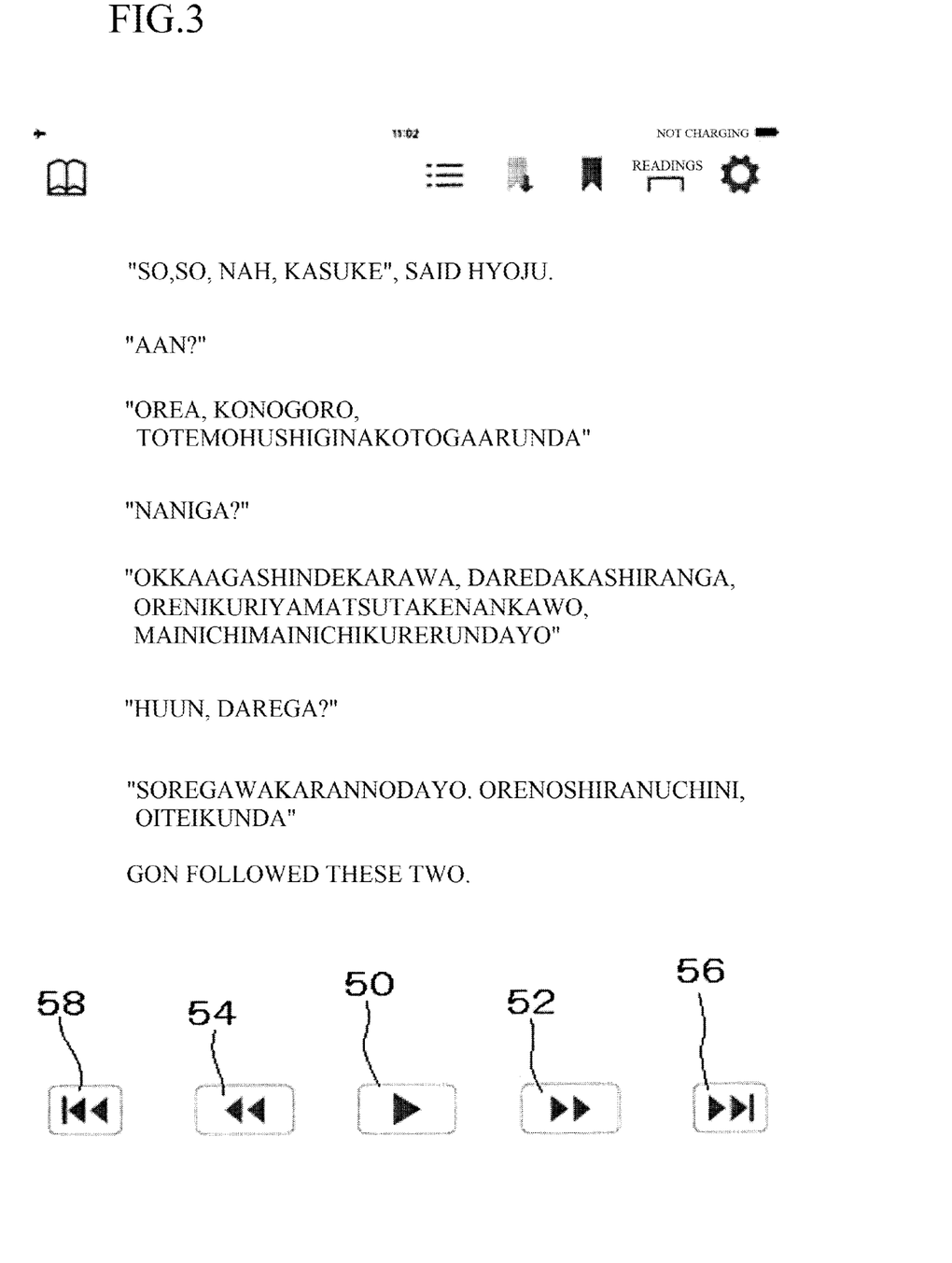
FIG. 3 is an explanatory drawing illustrating a display unit of the terminal device.

In association with the execution of the reproduction software A, a screen as illustrated in FIG. 3, for example, is displayed on the display unit 41 of the terminal device 40.

In the example illustrated in this drawing, part of a text in a digital content is displayed from a right to a left direction. Under the text, the play button 50, a fast-forward button 52, a rewind button 54, a next page button 56, and a front page button 58 are displayed.

As the display unit 41 is a touch panel, when the operator (student) taps any above-described one of the play button 50, the fast-forward button 52, the rewind button 54, the next page button 56, and the front page button 58, or directly taps the phrase desired to listen, the reproduction software A executes the respective operations.

For example, when the operator (student) taps the play button 50, the reproduction software A reproduces a voice data file corresponding to the text displayed on the display unit 41.

When reproduction of the voice data file is terminated, the operator (student) may reproduce the same phrase again by tapping the rewind button 54 if comprehension is not sufficient.

In order to proceed the next page, tapping the next page button 56 causes the reproduction software to display a text of a next phrase on the display unit 41.

When reproduction of the voice data file is performed, ID information and reproduction start time of the phrase for each phrase are memorized in the memory unit 46 as reproduction log data. In addition, examples of the reproduction log data also include data including time and date, operation information operated on the terminal device 40 (operation of the play button and the stop button), reproduction information (content of the phrase), and set value change information from the server device 30.

The reproduction software also covers pinch-in and pinch-out operations. When the operator (student) performs the pinch-in operation, the reproduction software reduces respective characters displayed on the display unit 41 to display a larger number of characters. Therefore, the number of characters to be displayed in one screen is increased.

In contrast, when the operator (student) performs the pinch-out operation, the reproduction software enlarges the respective characters displayed on the display unit 41 and reduces the displayed number of characters. Therefore, the number of characters displayed in one screen is reduced.

Although a reproduction time per screen changes as well in association with the pinch-in or the pinch-out operation, the pinch-in or the pinch-out operation may also be recorded as the reproduction log data by memorizing the first phrase and the last phrase displayed in the screen as a log together with the reproduction time in one phrase unit. In the same manner, a scrolling operation may also be recorded.

After reproduction of one learning digital content has been terminated, all the reproduction log data memorized in the memory unit 46 is transmitted to the server device 30 together. Transmission of the reproduction log data may be performed at a timing when the reproduction by the reproduction software A is terminated.

However, the transmission of the reproduction log data by phrase to the server device 30 may be performed every time when detection of the reproduction time in one phrase is terminated.

The terminal device 40 may include a camera 70 that is directed in the same direction as that of a surface of the display unit 41.

The camera 70 is disposed so as to be directed toward the operator (student) who operates the display unit 41. The camera 70 includes a lens and an image-pickup element. A visual line detection unit 75 that detects a visual line from the shot image is connected to the camera 70.

The visual line detection unit 75 includes an arithmetic device and a memory, and is configured to allow entry of data from the image-pickup element to detect the visual line.

There are various methods of detecting the visual line. For example, the visual line detection unit 75 can determine the position of the visual line by detecting positions of pupils and corneal reflexes from the shot image. As another method, there is a method of detecting centers of the pupils by the visual line detection unit 75 and determining the center positions of the pupils as the position of the visual line.

The visual line detection unit 75 detects the position of the visual line continuously. The detected positions of the visual line are memorized in the memory unit 46 together with reproduction log data of phrases of the text data displayed on the visual line.

The visual line detection unit 75 also counts stopped number of times in the case where the detected visual line stops at the same position. The counted stopped number of times of the visual line is memorized in the memory unit 46 together with the reproduction log data.

An operation of the camera 70 is started by the operator (student) tapping a visual line following button (not illustrated) displayed on the display unit 41. Termination of the operation of the camera 70 is stopped by the operator (student) tapping the visual line following button (not illustrated) displayed on the display unit 41.

However, instead of operating the camera 70 only when the operator (student) instructs, the camera 70 may automatically detect the position of the visual line together with reproduction of the digital content after the activation of the reproduction software A.

In addition, the terminal device 40 is provided with a tapped position detection unit 72 that, when the operator (student) taps the display unit 41 during reproduction of the learning digital content, detects the tapped position. The tapped position detection unit 72 detects a tapped position in the text data of the learning digital content which is being reproduced by the reproduction software A based on a tap detection signal from the display unit 41. The tapped position detection unit 72 may be provided as a function of the control unit 44

Figure 4:
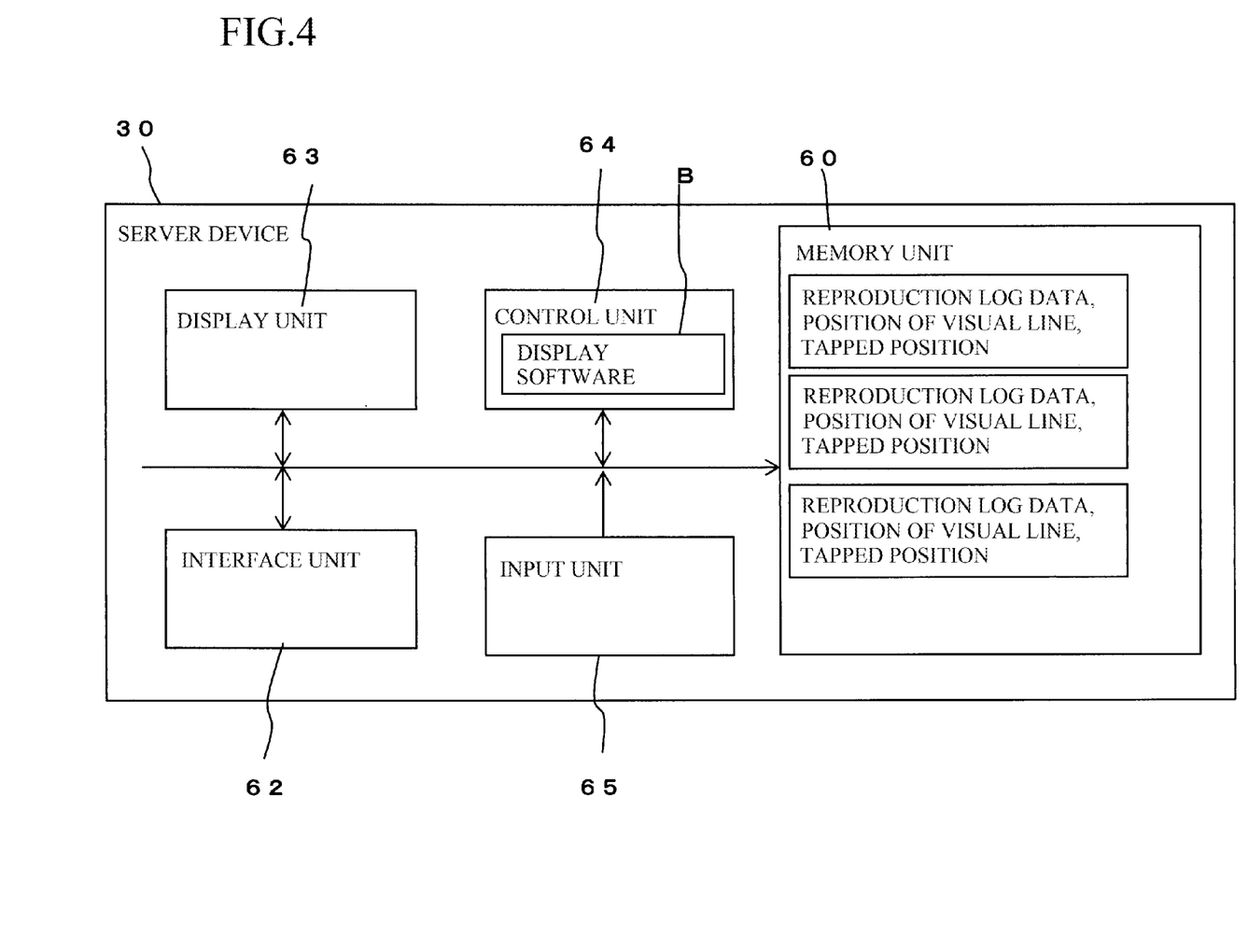
FIG. 4 is a block diagram illustrating an internal configuration of a server device.

Subsequently, a configuration of the server device 30 is illustrated in FIG. 4.

The server device 30 may employ a general computer (PC). The server device 30 includes a memory unit 60 including an HDD and the like, an interface unit 62 for connecting to the internet, a control unit 64 including a CPU, a memory and the like, a display unit 63 including a monitor and the like, and an input unit 65 including a mouse, a keyboard, and the like.

The above-described display unit 63 corresponds to a server display unit in Claims, the above-described interface unit 62 corresponds to a receiver unit in Claims, and the above-described control unit 64 executes display software described later to realize a display control unit in Claims.

In the server device 30, the reproduction log data (the position of the visual line, if the tapped position exists, data including the tapped position) transmitted from the respective terminal devices 40 are received by the interface unit 62 and are memorized in the memory unit 60.

The control unit 64 of the server device 30 is able to convert the reproduction log data memorized in the memory unit 60 (including at least ID information by phrase and reproduction start time by phrase) into time spent on reproduction by phrase and the number of times of reproduction by phrase, and causing the display unit 63 to display the converted time spent on reproduction by phrase and number of times of reproduction by phrase. In other words, a data conversion unit in Claims corresponds to the control unit 64 which realizes a data conversion function.

Here, a configuration of the reproduction log data is illustrated in FIG. 5.

The reproduction log data to be generated by each of the respective terminal devices 40 includes times and dates when any operation buttons are operated, content of operation, states of the terminal device 40, titles, reproduction file names, phrase IDs, and text data of the corresponding phrases.

The control unit 64 calculates time spent on reproduction of each phrase based on the reproduction start time by phrase and the reproduction start times of the next phrase. The control unit 64 calculates the number of times of reproduction of each phrase based on the number of the same file names existing for each file name by phrase.

Display of times spent on reproduction of the respective phrases and the numbers of times of reproduction of the respective phrases calculated from the reproduction log data by the control unit 64 is executed by display software B memorized in the memory unit 60 in advance.

Figure 6:
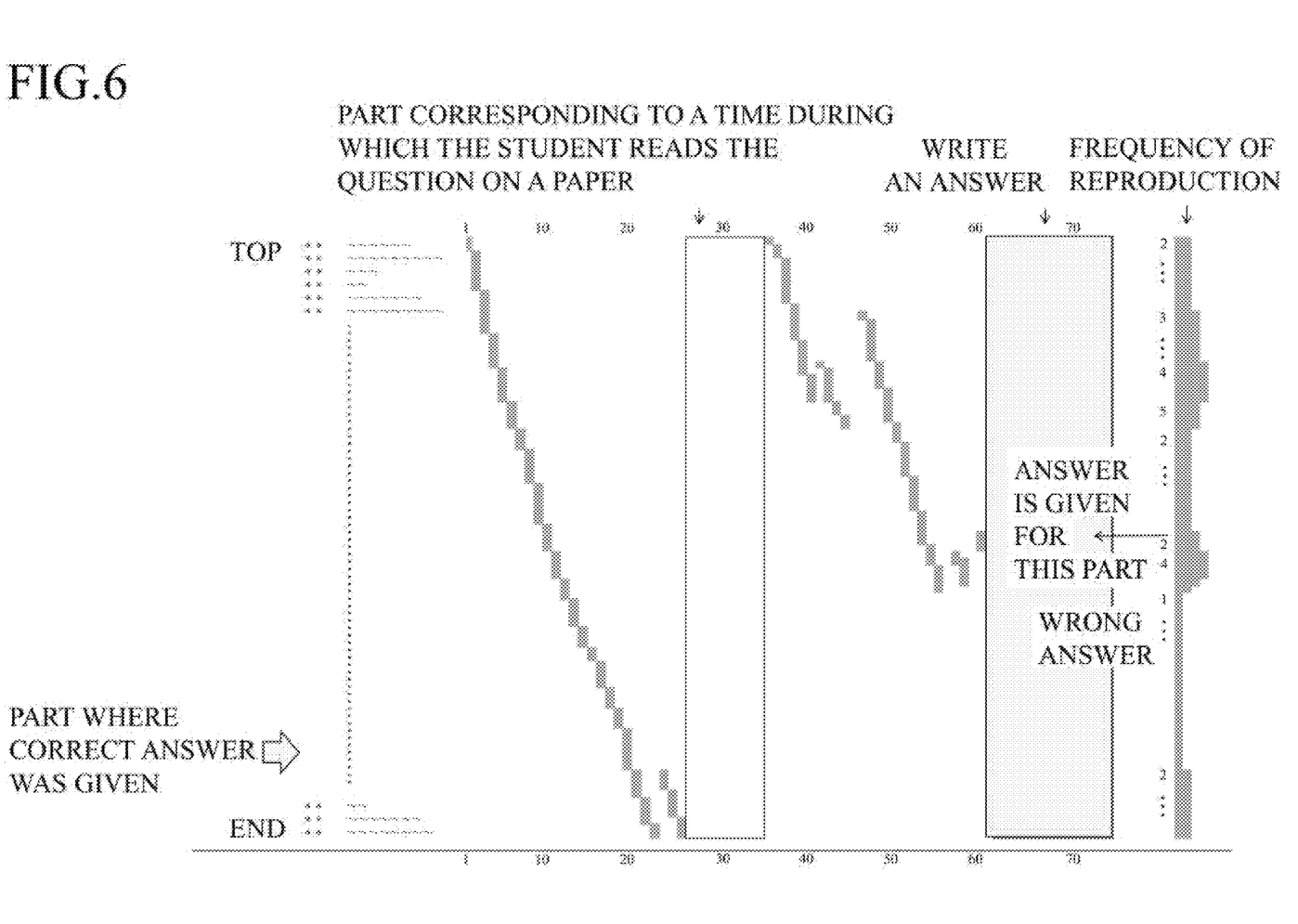
FIG. 6 is a high level illustration with reference to exemplary phrases in sentences shown schematically on the left side of the figure, respresented by "squiggly lines" illustrating a graph of times spent on reproduction and numbers of times of reproduction.
Figure 7:
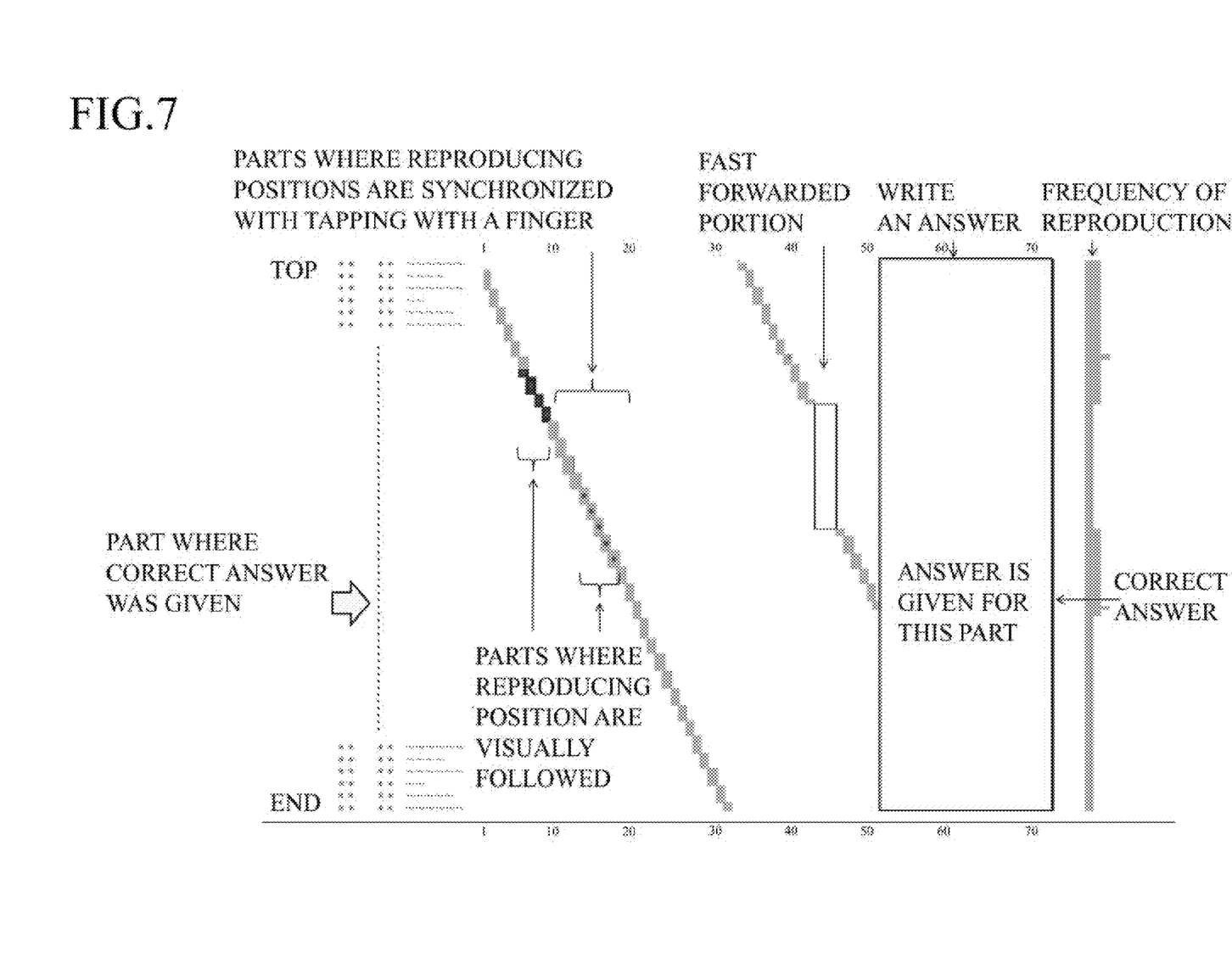
FIG. 7 is a high level illustration with reference to exemplary phrases in sentences shown schematically on the left side of the figure, respresented by "squiggly lines" drawing illustrating a graph of times spent on reproduction, numbers of times of reproduction, positions of visual lines, and tapped position.

FIG. 6 and FIG. 7 illustrate times spent on reproduction of the respective phrases to be displayed on the display unit 63 and the numbers of times of reproduction of the respective phases.

In the graph in FIG. 6, a lateral axis represents time and a vertical axis represents the learning digital content in which a text is divided into predetermined ranges (by phrase range) so that a beginning of the text comes to a top and an end of the text comes to a bottom. The numbers of times of reproduction are shown by a bar graph on a right side of the graph with the lateral axis representing the number of times of reproduction.

Specifically, in a column along the vertical axis, the text of the learning digital content is divided by phrase range, and the divided strings are displayed from the top in order. The reproduction times corresponding to these phrases are indicated by the length of the squares along the lateral axis.

The learning digital content includes a question displayed at an end of the text. The student rewinds the displayed learning digital content and makes a study on a part corresponding to the question.

From FIG. 6, it is understood that after the graph reaches the end of the text, the student rewinds the text and displays the part corresponding to the question again. Subsequently, a blank portion follows, which corresponds to a time during which the student reads the question on a paper. Then, it is understood that after the question on the paper has read, the student rewound and reproduced three times.

Then, another blank portion follows. This corresponds to a time during which the student writes an answer.

In contrast, on the right end of the graph, a bar graph which indicates the number of times of reproduction for predetermined parts by expanding as if being stacked rightward is shown, so that the parts where the student reproduced many times are readily apparent.

When viewing the number of times of reproduction, the number of times of reproduction is small at a part in situ where a correct answer was given, and the number of times of reproduction is large at a part where a wrong answer was given. Therefore, it indicates that the comprehension level of the student for the text was low. In addition, since the portion where the wrong answer was given is clearly shown, it gives a helpful guide for the future tutorship for the corresponding student.

FIG. 7 is a drawing showing the position of the visual line and the tapped position of the student displayed together with the times spent on reproduction of the respective phrases and the number of times of reproduction of the phrase.

In the graph in FIG. 7 as well, a lateral axis represents time and a vertical axis indicates the learning digital content in which a text is divided into phrases so that a beginning of the text comes to a top and an end of the text comes to a bottom. The numbers of times of reproduction are shown by a bar graph on a right side of the graph with the lateral axis representing the number of times of reproduction. These points are the same as FIG. 6.

In the graph in FIG. 7, when the visual line exists in the phrase, circle signs are displayed in squares which indicate the reproduction times of the respective phrases. The circle may be displayed in colors different from the colors of the squares. By the positions of the visual line being apparent, whether or not the student reads the text reliably may be easily determined.

In addition, in the graph in FIG. 7, the colors of the squares which indicate the reproduction times of the part on the display unit 41 of the terminal device 40 tapped by the student are differentiated from colors of the squares of different parts. By the positions where the student tapped being apparent, whether or not the student reads the text reliably may easily be determined.

In FIG. 7, in the second reproduction (after the question at the end of the text has been read), there is a fast forwarded part in the middle. This part is irrelevant to the answer for the question. However, the student fast forwarded this part based on understanding that this part is irrelevant to the answer for the question at the time of the first reproduction, so that it is understood that the student understands the text well.

Note that parts where the number of times of reproduction (displayed as the frequency of reproduction on the drawing) is high may be determined from the bar graph indicating the number of times of reproduction on the right end of the graph, and points where the reproduction time is long may also be determined, so that parts difficult to comprehend in the text for the student may easily be figured out.

Figure 8:
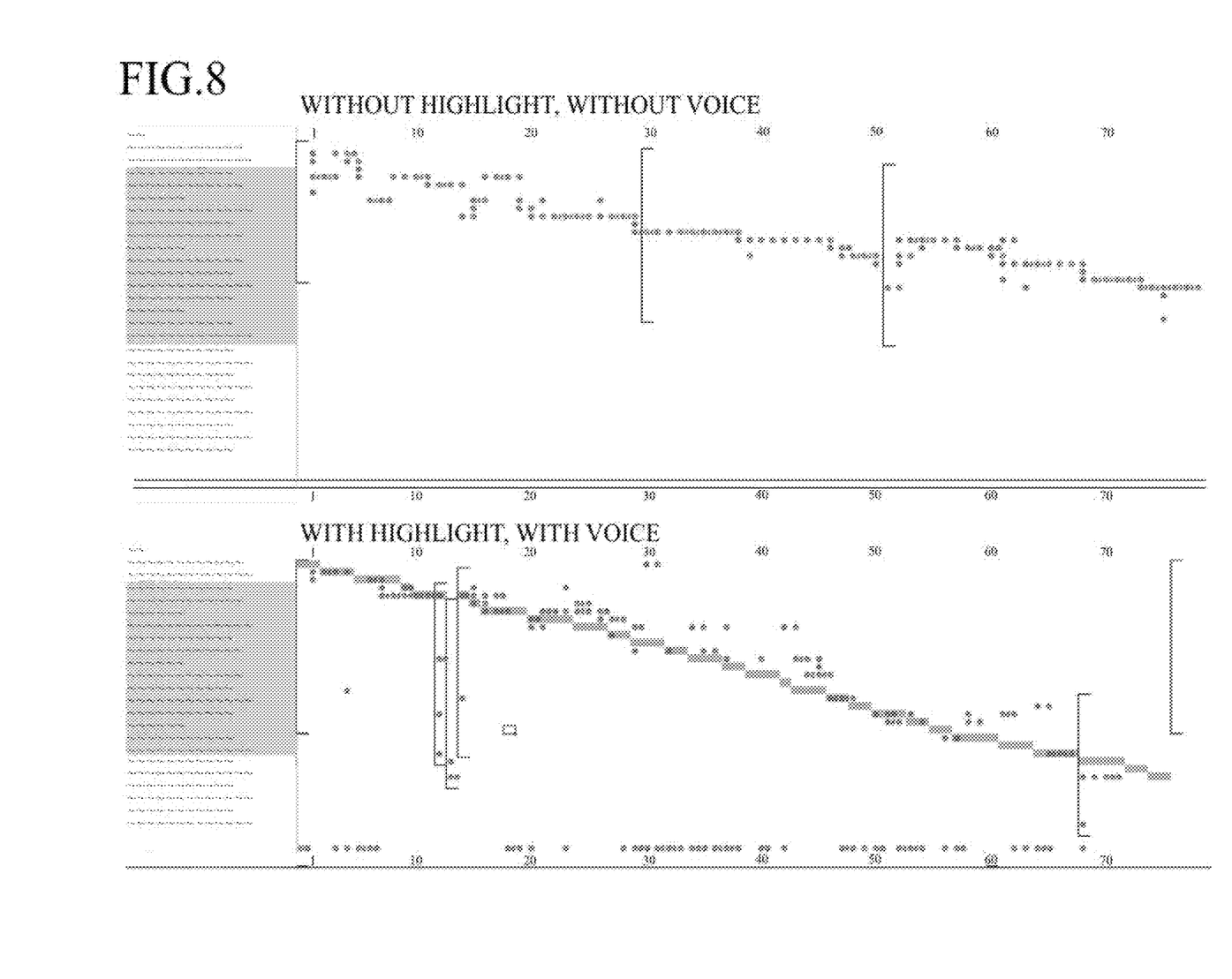
FIG. 8 is a high level illustration with reference to exemplary phrases in sentences shown schematically on the left side of the figure, respresented by "squiggly lines" illustrating a graph of times spent on reproduction and positions of visual lines.

The graph illustrated in FIG. 8 is a graph indicating times spent on a student X to reproduce the digital content and his/her positions of the visual line. The graph shown on an upper side indicates only the positions of the visual line with highlight display by phrase and voice reproduction on the display unit 41 not being effected. The graph shown on a lower side is a graph indicating times spent on reproduction of the respective phrases and the positions of the visual line in a case where the phrase-to-phrase highlighting on the display unit 41 is effected and the voice reproduction is also effected.

Note that the parts illustrated with "[" in FIG. 8 indicate the first phrase and the last phrase displayed in one screen.

As used herein the term highlight display is intended to mean a display method for displaying predetermined phrases in visually prominent manner by changing a background color from other parts in the display unit 41. The operator (student) may set whether or not the highlighted display is effected by operating the reproduction condition setting unit 49.

In the example shown in the upper graph in FIG. 8, if highlighting and voice output are not effected, it is understood that reading of the student X is slow because of repetitive reading of the same phrase or the visual line staying on the same phrase for a long time.

In the example shown in the lower graph in FIG. 8, if the highlight and the voice output are effected, it is understood that the reading speed is high, and visual line moves here and there including outside the screen, so that the characters are not read visually and the reading speed is increased due to guaranteed information supply by voice.

The position of the visual line may be outside the display unit 41 instead of inside the display unit 41. In such a case, the reproduction software A may be configured to display the position of the visual line at the bottom portion of the graph as in the lower graph. When the position of the visual line is displayed at the bottom portion of the graph, it is understood that the digital content of this part is read little if anything.

Figure 9:
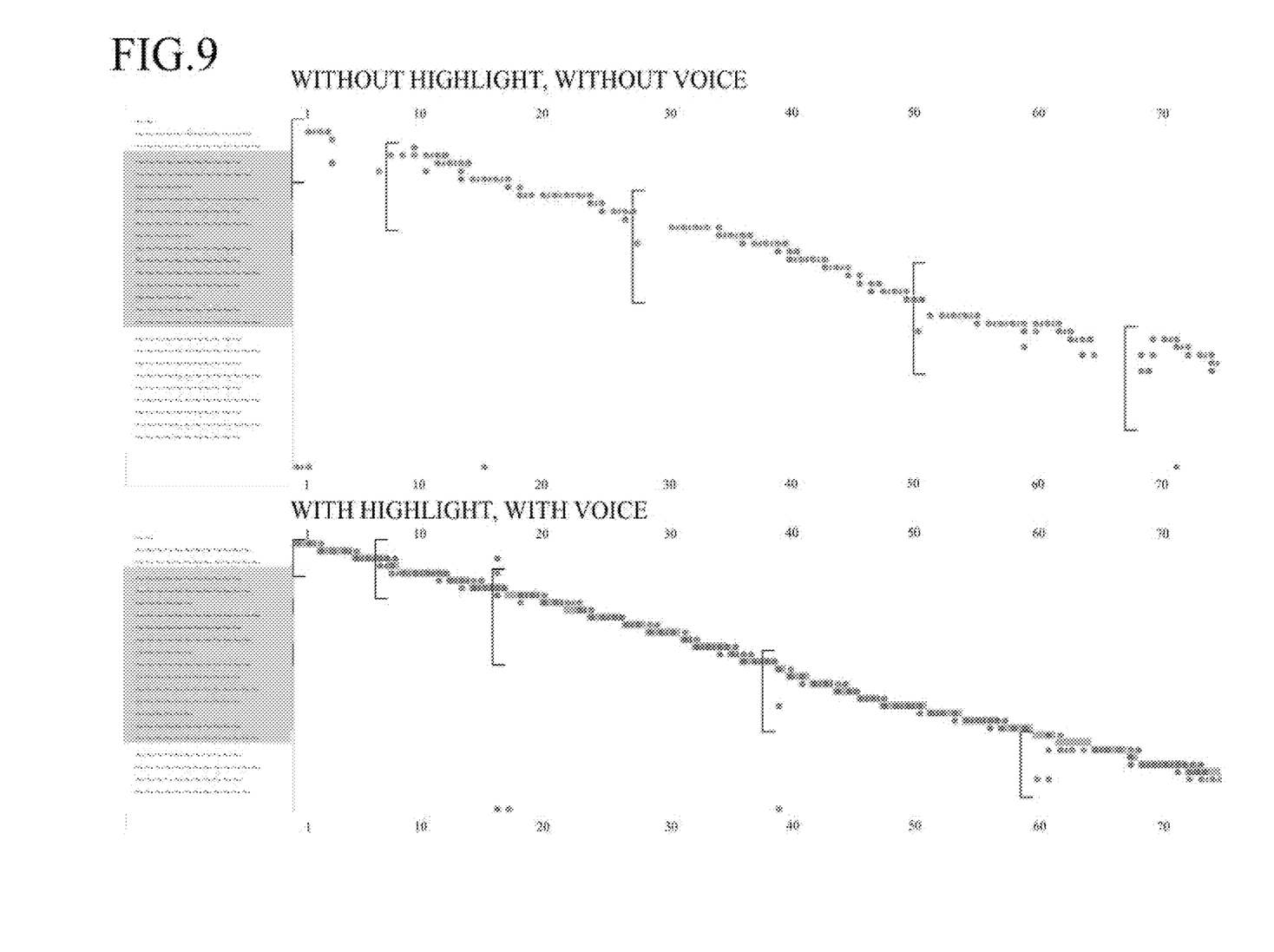
FIG. 9 is a high level illustration with reference to exemplary phrases in sentences shown schematically on the left side of the figure, respresented by "squiggly lines" illustrating another graph of times spent on reproduction and positions of the visual lines.

The graph illustrated in FIG. 9 is a graph indicating times spent on a student Y to reproduce the digital content and his/her positions of the visual line. The graph shown on an upper side indicates only the positions of the visual line with highlight display by phrase and voice reproduction on the display unit 41 not being effected. The graph shown on a lower side is a graph indicating times spent on reproduction of the respective phrases and the positions of the visual line in a case where the phrase-to-phrase highlighting on the display unit 41 is effected and the voice reproduction is also effected.

It is understood from the upper graph and the lower graph in FIG. 9 that the reading speeds in both cases are not much different.

When the lower graphs in FIG. 8 and FIG. 9 are compared with each other, the squares representing the time spent on reproduction match the position of the visual line and the inclination of the squares representing the time spent on reproduction is steeper in the lower graph in FIG. 9. Therefore, it is understood that the student Y reads the digital content more accurately also visually.

Next, an example in which the terminal device 40 itself displays as illustrated in FIG. 6 to FIG. 9 will be described.

Figure 10:
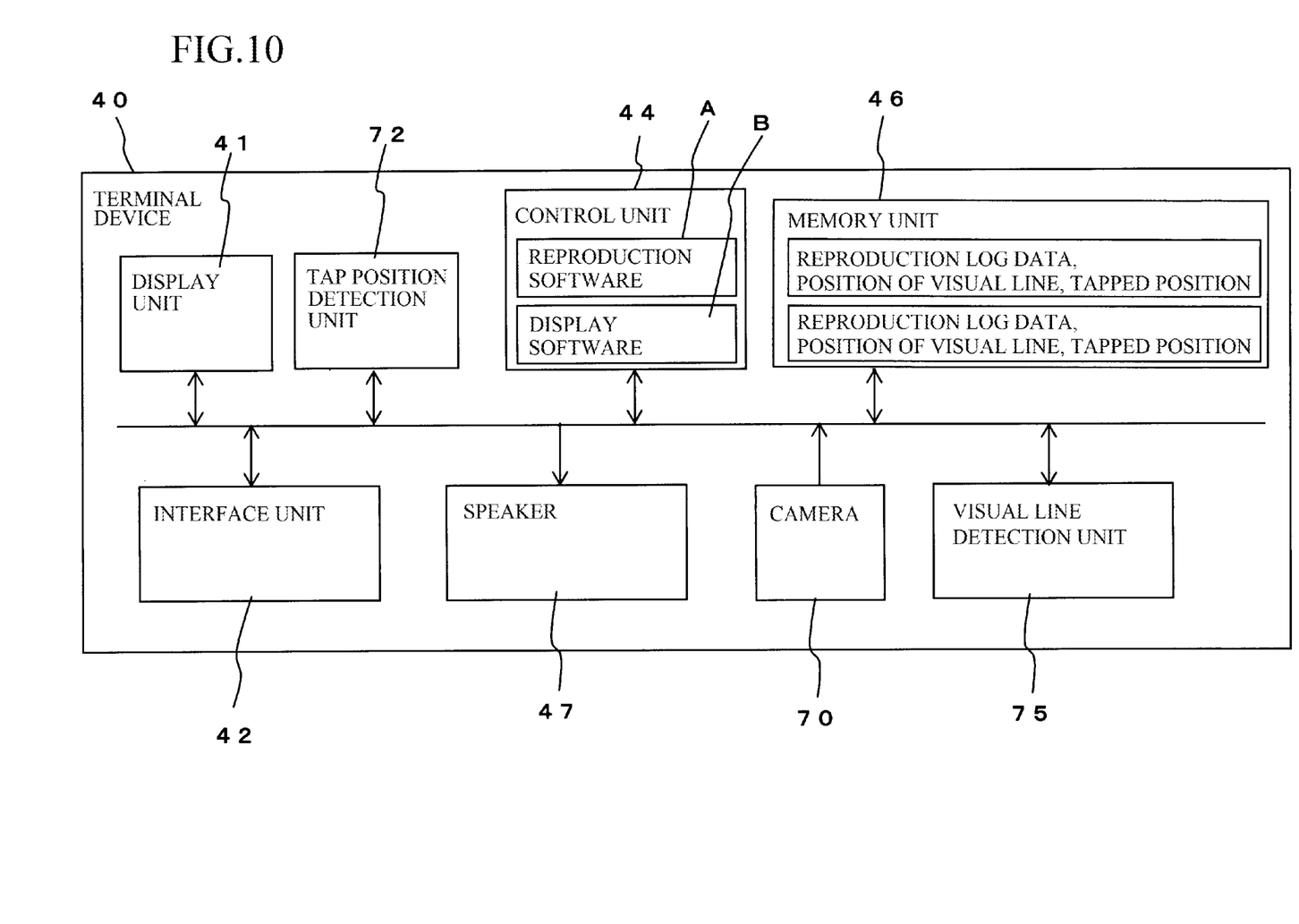
FIG. 10 is a block diagram illustrating another configuration of the terminal device.

A configuration of the terminal device 40 in this case is illustrated in FIG. 10. The same components as the components described above may be designated by the same reference numerals, and description may be omitted.

The control unit 44 of the terminal device 40 is able to convert the reproduction log data memorized in the memory unit 46 (including at least ID information by phrase and reproduction start time by phrase) into time spent on reproduction by phrase and the number of times of reproduction by phrase, and causing the display unit 41 to display the converted time spent on reproduction by phrase and number of times of reproduction by phrase.

Display of times spent on reproduction of the respective phrases and the numbers of times of reproduction of the respective phrases is executed by the display software B memorized in the memory unit 46 in advance being read out by the control unit 44.

At this time, when only the times spent on reproduction of the respective phrases and the numbers of times of reproduction of the respective phrases are displayed, the same content as that illustrated in FIG. 6 is displayed on the display unit 41 of the terminal devices 40.

When the times spent on reproduction of the respective phrases, the numbers of times of reproduction of the respective phrases, the positions of the visual line, and the tapped positions are displayed on the display unit 41 of the terminal device 40 in combination, the same content as that illustrated in FIG. 7 is displayed thereon.

When a graph which shows only the positions of the visual line with highlight display by phrase and the voice reproduction not being effected, and a graph which shows the times spent on reproduction of the respective phrases and the positions of the visual lines with the highlighted display by phrase and also the voice reproduction being effected are displayed on the display unit 41 of the terminal device 40 as the graph showing the time spent on reproduction of the digital content and the positions of the visual line, the same content as that illustrated in FIG. 8 or FIG. 9 is displayed.

By executing the displays as described above on the terminal devices 40, the students themselves are able to recognize the comprehension level on the content of the text.

Figure 11:
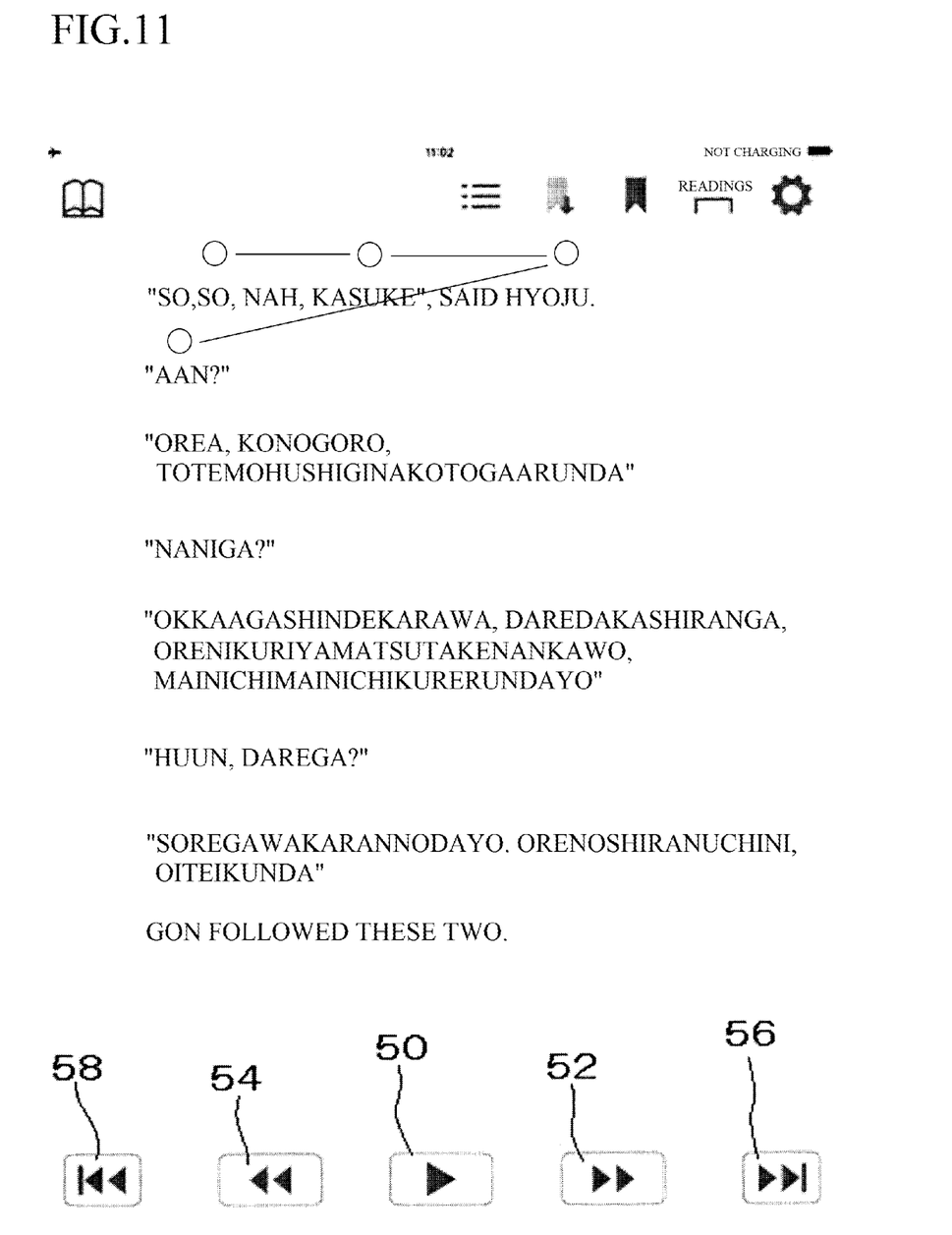
FIG. 11 is an explanatory drawing illustrating an example in which the positions of visual line are displayed on the terminal device together with text data.

The terminal devices 40 are also able to display detected positions of the visual line during reproduction of the learning digital content. An example is illustrated in FIG. 11.

The reproduction software A of the terminal device 40 displays the positions of the visual line shot by the camera 70 and detected by the visual line detection unit 75 on a real-time basis. The reproduction software A displays the positions of the visual line with a circle shape during a high-speed reproduction.

In the embodiment described thus far, reproduction of the recorded voice data has been described. However, a TTS (Text To Speech) system that converts text data into voice data without having recorded voice data may also be employed. However, when the TTS system is employed, a control unit provided with a TTS function needs to be provided in the terminal device 40.

Although various modes of the present invention have been described with a preferred embodiment, the present invention is not limited to this embodiment, and a number of modifications may be made without departing the spirit of the invention, as a matter of course.

What is claimed is:

1. An education support system comprising:
one or more terminal devices including:
a terminal display unit that displays text data of a digital content including text data and voice data created by reading out the text data, a voice output unit that outputs the voice data of the digital content by voice, a reproduction log data memory unit that stores at least ID information on phrases of the digital content reproduced by the terminal display unit and the voice output unit and reproduction start times of the phrases for each of the phrases as reproduction log data, and a transmission unit that transmits the reproduction log data stored in the reproduction log data memory unit; and a server unit including:
a receiver unit that receives the reproduction log data transmitted from each of the terminal devices, a data conversion unit that converts the reproduction log data of each of the terminal devices received by the receiver unit into times spent on reproduction and numbers of times of reproduction by phrase of the digital content, a server display unit that displays the times spent on reproduction and numbers of times of reproduction by phrase of the digital content converted by the data conversion unit, and a display control unit that arranges strings of phrases in the reproduction log data to be displayed by the server display unit in a vertical direction, displays times spent on reproduction of the strings of the phrases to be displayed with the lateral length of the squares on a right side of the respective strings, and displays number of times of reproduction by phrase on the same screen.

2. The education support system according to claim 1, wherein the terminal device comprises:
a camera that is directed in the same direction as that of a display surface of the terminal display unit, and
visual line detecting means that calculates a visual line direction of an operator by analyzing eye images of the operator of the terminal device taken by the camera and detects a part in a text of the digital content displayed on the terminal display unit to which the calculated visual line is directed,
wherein a part to which the visual line is directed and which is detected by the visual line detecting means is stored in the reproduction log data memory unit in association with the reproduction log data, and
wherein the display control unit of the server device displays a string to which the visual line is directed in association with the string of the phrase to be displayed on the server display unit.

3. The education support system according to claim 1, wherein the terminal device comprises:
the terminal display unit is a touch panel, and
tapped position detecting means is provided, the tapped position detecting means detecting, when the operator taps the terminal display unit during reproduction of the digital content, a part tapped by the operator of the terminal device in the text of the digital content displayed on the terminal display unit,
wherein the tapped part detected by the tapped position detecting means is stored in the reproduction log data memory unit in association with the reproduction log data, and
wherein the display control unit of the server device displays tapped strings in association with the strings of the phrase to be displayed on the server display unit.

4. The education support system according to claim 1, wherein the terminal device comprises:
a reproduction condition setting unit capable of setting reproduction time setting information including at least a character format, a character color, and voice output conditions by instructions from both the server device and the corresponding terminal device and causes display and voice output of the digital content to be executed on the preset conditions.

5. The education support system according claim 1, wherein the terminal device stores the content of operation that the operator of each of the respective terminal devices has performed in the reproduction log data memory unit as the reproduction log data.

6. A terminal device comprising:
a display unit that displays text data of a digital content including text data and voice data created by reading out the text data,
a voice output unit that outputs the voice data of the digital content by voice,
a reproduction log data memory unit that stores at least ID information on phrases of the digital content reproduced by the display unit and the voice output unit and reproduction start times of the phrases for each of the phrases as reproduction log data, and
a data conversion unit that converts the reproduction log data of the reproduction log data memory unit into times spent on reproduction and numbers of times of reproduction by phrase of the digital content, and
a display control unit that arranges strings of phrases in the reproduction log data converted by the data conversion unit in a vertical direction, displays times spent on reproduction of the strings of the phrases to be displayed with the lateral length of the squares on a right side of the respective strings, and displays number of times of reproduction by phrase on the same screen.

7. The terminal device according to claim 6, comprising:
a camera that is directed in the same direction as that of a display surface of the terminal display unit, and
visual line detecting means that calculates a visual line direction of an operator by analyzing eye images of the operator taken by the camera and detects a part of a text of the digital content displayed on the display unit to which the calculated visual line is directed,
wherein a part to which the visual line is directed and which is detected by the visual line detecting means is stored in the reproduction log data memory unit in association with the reproduction log data, and
wherein the display control unit displays a string to which the visual line is directed in association with the string of the phrase to be displayed on the display unit.

8. The terminal device according to claim 7, wherein the part to which the visual line is directed and which is detected by the visual line detecting means is displayed on the display unit in the display of the text data.

9. The terminal device according to claim 6,
wherein the display unit is a touch panel,
wherein tapped position detecting means is provided, the tapped position detecting means detecting, when the operator taps the display unit during reproduction of the digital content, the part tapped by the operator in the text of the digital content displayed on the display unit,
wherein the tapped part detected by the tapped position detecting means is stored in the reproduction log data memory unit in association with the reproduction log data, and
wherein the display control unit displays tapped strings in association with the strings of the phrase to be displayed on the display unit.

10. The terminal device according to claim 6, wherein the content of operation that the operator has performed is stored in the reproduction log data memory unit as the reproduction log data.

11. The education support system according to claim 2, wherein the terminal device comprises:
the terminal display unit is a touch panel, and
tapped position detecting means is provided, the tapped position detecting means detecting, when the operator taps the terminal display unit during reproduction of the digital content, a part tapped by the operator of the terminal device in the text of the digital content displayed on the terminal display unit,
wherein the tapped part detected by the tapped position detecting means is stored in the reproduction log data memory unit in association with the reproduction log data, and
wherein the display control unit of the server device displays tapped strings in association with the strings of the phrase to be displayed on the server display unit.

* * * * *